United States Patent
Ueba et al.

(10) Patent No.: US 9,593,192 B2
(45) Date of Patent: Mar. 14, 2017

(54) METHOD FOR PRODUCING MODIFIED POLYMER AND HYDROGENATED PRODUCT THEREOF

(71) Applicant: JSR CORPORATION, Tokyo (JP)

(72) Inventors: Kentarou Ueba, Tokyo (JP); Sadataka Oota, Tokyo (JP); Yoshirou Sakura, Tokyo (JP)

(73) Assignee: JSR CORPORATION, Tokyo (JP)

( * ) Notice: Subject to any disclaimer, the term of this patent is extended or adjusted under 35 U.S.C. 154(b) by 309 days.

(21) Appl. No.: 14/292,386

(22) Filed: May 30, 2014

(65) Prior Publication Data

US 2014/0275422 A1 Sep. 18, 2014

Related U.S. Application Data

(63) Continuation of application No. PCT/JP2012/079306, filed on Nov. 12, 2012.

(30) Foreign Application Priority Data

Dec. 7, 2011 (JP) .................................. 2011-267788

(51) Int. Cl.
*C08F 236/10* (2006.01)
*C08F 6/10* (2006.01)
(Continued)

(52) U.S. Cl.
CPC .............. *C08F 236/10* (2013.01); *C08C 1/12* (2013.01); *C08C 19/25* (2013.01); *C08F 2/06* (2013.01);
(Continued)

(58) Field of Classification Search
None
See application file for complete search history.

(56) References Cited

U.S. PATENT DOCUMENTS 6,451,906 B1 * 9/2002 Saito ....................... C08L 69/00
524/442
2011/0218300 A1 9/2011 Thiele et al.

FOREIGN PATENT DOCUMENTS

JP 9-255716 A 9/1997
JP 2003-171418 A 6/2003
(Continued)

OTHER PUBLICATIONS

Extended European Search Report issued May 27, 2015 in Patent Application No. 12855910.1

*Primary Examiner* — Catherine S Branch
(74) *Attorney, Agent, or Firm* — Oblon, McClelland, Maier & Neustadt, L.L.P.

(57) ABSTRACT

A method for producing a modified polymer or a hydrogenated product thereof, includes polymerizing a monomer in a polymerization solvent which includes a hydrocarbon-based solvent, using a polymerization initiator to obtain a reaction solution. A functional group is introduced into the modified polymer or the hydrogenated product thereof, using a compound having the functional group protected with a silyl group. The reaction solution is separated into a solvent fraction including the hydrocarbon-based solvent, and a solid fraction including the modified polymer or the hydrogenated product thereof. The solvent fraction separated from the reaction solution is distilled to obtain a low-boiling fraction including the hydrocarbon-based solvent and a silanol compound. At least part of the silanol compound is removed from the low-boiling fraction by liquid-liquid extraction. At least part of a raffinate of the low-boiling fraction is recycled as a polymerization solvent.

19 Claims, 2 Drawing Sheets

(51) Int. Cl.
    *C08C 19/25*     (2006.01)
    *C08C 1/12*     (2006.01)
    *C08F 2/06*     (2006.01)
    *C08F 6/06*     (2006.01)
    *C08F 6/04*     (2006.01)
    *C08J 11/02*     (2006.01)
    *B01D 11/04*     (2006.01)

(52) U.S. Cl.
    CPC .................. *C08F 6/04* (2013.01); *C08F 6/06* (2013.01); *C08F 6/10* (2013.01); *B01D 11/0426* (2013.01); *C08J 11/02* (2013.01)

(56) References Cited

FOREIGN PATENT DOCUMENTS

| | | |
|---|---|---|
| JP | 2008-260854 A | 10/2008 |
| JP | 2009-227858 A | 10/2009 |
| WO | WO 2010/056694 A1 | 5/2010 |

\* cited by examiner

METHOD FOR PRODUCING MODIFIED POLYMER AND HYDROGENATED PRODUCT THEREOF

CROSS-REFERENCE TO RELATED APPLICATIONS

The present application is a continuation application of International Application No. PCT/JP2012/079306, filed Nov. 12, 2012, which claims priority to Japanese Patent Application No. 2011-267788, filed Dec. 7, 2011. The contents of these applications are incorporated herein by reference in their entirety.

BACKGROUND OF THE INVENTION

Field of the Invention

The present invention relates to a method for producing a modified polymer or a hydrogenated product thereof.

Discussion of the Background

A polymer or a copolymer having different properties or the like can be produced using a conjugated diene and an aromatic vinyl compound by changing the content of the aromatic vinyl compound or the like, and has been used in various applications. Such a polymer or copolymer is normally produced by solution polymerization that uses a hydrocarbon-based solvent or the like and an active organometal catalyst or the like as a polymerization initiator. It is necessary to use a high-purity raw material (monomer) and a high-purity polymerization solvent for solution polymerization since impurities affect the polymerization reaction. However, the solvent recovered after polymerization includes light components such as water, unreacted monomer, an alcohol, and an aldehyde, and heavy components such as a low-molecular-weight polymer (e.g., oligomer) and various additives (e.g., antioxidant). It is undesirable to recycle the recovered solvent directly for polymerization.

A functional group may be introduced into the main chain, the side chain, or the molecular end of the above polymer or copolymer during production using the modification method described later in order to provide various properties. A functional group that includes an active proton (e.g., amino group or mercapto group) is useful as the functional group although the desirable functional group differs depending on the properties required for the modified polymer or the copolymer. However, when a compound having an active proton is added to the reaction solution, the polymerization active end may be inactivated due to the active proton. In order to deal with the above problem, a method has been proposed that introduces a functional group into a polymer using a compound in which an active proton is protected with a silyl group, and effects hydrolysis using an appropriate method to obtain a modified polymer or a modified copolymer that includes a functional group having an active proton. In this case, a silanol compound is included in a solvent to be recovered.

A functional group-containing compound used to incorporate a functional group in the main chain, the side chain, or the molecular end of a polymer is referred hereinafter to as "modifier". Note that three modification methods may be used as described later, and the term "modifier" is used as a generic name for an initiator, a functional group-introducing monomer, or a polymerization terminator having a functional group.

When a silanol compound is included in a polymerization solvent, polymerization is inhibited by the silanol compound. When the content of the silanol compound is low, the silanol compound can be made harmless by increasing the amount of the polymerization initiator to produce a metal silanolate, for example. However, since a silanol compound is produced when the reaction solution containing the metal silanolate is brought into contact with water in a solvent removal step using a steam stripping method or the like, the solvent to be recovered includes silanol compounds derived from the modifier and the metal silanolate. Therefore, when the solvent is repeatedly recycled, the silanol compound concentration in the solvent increases, and it becomes difficult to make the silanol compound harmless by increasing the amount of the polymerization initiator, for example. In this case, the recovered solvent cannot be recycled as a polymerization solvent. Therefore, it is necessary to remove the silanol compound in order to recycle the recovered solvent for polymerization when producing a modified polymer or a hydrogenated product thereof.

The hydrogenated product is obtained by hydrogenating the modified polymer or the copolymer using a normal method, and the silanol compound is included in the solvent recovered using a steam stripping method or the like.

It is necessary to remove a component that inhibits polymerization when recycling the recovered solvent as a polymerization solvent. For example, a method has been known that washes a hydrocarbon-based solvent separated from a polymer with water, followed by dehydration to remove a lower alcohol used as a polymerization terminator, and recycles at least part of the hydrocarbon-based solvent for a polymerization reaction (see JP-A H9-255716, for example). According to the method disclosed in JP-A H9-255716 that removes a lower alcohol through washing with water and dehydration, it is possible to remove a silanol compound in addition to a lower alcohol by optimizing the volume of water used for washing. The method needs to treat the entire solvent. A method that removes a silanol compound through adsorption on alumina has also been known (see WO2010/056694, for example).

SUMMARY OF THE INVENTION

According to one aspect of the present invention, a method for producing a modified polymer or a hydrogenated product thereof, includes polymerizing a monomer including at least one of a conjugated diene or an aromatic vinyl compound in a polymerization solvent which includes a hydrocarbon-based solvent, using a polymerization initiator which includes an active organometal to obtain a reaction solution in which the modified polymer or the hydrogenated product thereof is dissolved in the polymerization solvent. A functional group is introduced into at least one of a main chain or a side chain of the modified polymer or the hydrogenated product thereof, using a compound having the functional group protected with a silyl group as a polymerization initiator, as a functional group-introducing monomer, or as a polymerization terminator. The reaction solution is separated into a solvent fraction including the hydrocarbon-based solvent, and a solid fraction including the modified polymer or the hydrogenated product thereof. The solvent fraction separated from the reaction solution is distilled to obtain a low-boiling fraction including the hydrocarbon-based solvent and a silanol compound. At least part of the silanol compound is removed from the low-boiling fraction by liquid-liquid extraction using the low-boiling fraction and an extraction solvent. At least part of a raffinate of the low-boiling fraction from which the at least part of the silanol compound has been removed by the liquid-liquid extraction is recycled as a polymerization solvent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Embodiments of the present invention are as follows.
1. A method for producing a modified polymer or a hydrogenated product thereof comprising polymerizing a monomer comprising at least one of a conjugated diene and an aromatic vinyl compound in a hydrocarbon-based solvent as a polymerization solvent using an active organometal as a polymerization initiator to obtain a modified polymer or a hydrogenated product thereof, the modified polymer including a functional group in at least one of a main chain and a side chain, the functional group being introduced into the modified polymer using a compound having a functional group protected with a silyl group as a polymerization initiator, a functional group-introducing monomer, or a polymerization terminator, the method further sequentially comprising:
(a) a solvent removal step that separates a reaction solution in which the modified polymer or the hydrogenated product is dissolved in the polymerization solvent into a solvent fraction including the hydrocarbon-based solvent, and a solid fraction including the modified polymer or the hydrogenated product;
(b) a low-boiling fraction separation step that distils the solvent fraction to separate a low-boiling fraction including the hydrocarbon-based solvent and a silanol compound; and
(c) a silanol removal step that removes at least part of the silanol compound from the low-boiling fraction by liquid-liquid extraction using the low-boiling fraction and an extraction solvent, at least part of a raffinate from which the silanol compound has been removed by the liquid-liquid extraction being recycled as a polymerization solvent.
2. The method according to 1 above, wherein the silanol compound is at least one compound selected from the group consisting of trimethylsilanol, ethyldimethylsilanol, diethylmethylsilanol, dimethylpropylsilanol, dimethylisopropylsilanol, ethylmethylpropylsilanol, ethylmethylisopropylsilanol, triethylsilanol, n-butyldimethylsilanol, sec-buthyldimethylsilanol, and tert-butyldimethylsilanol.
3. The method according to 1 or 2 above, wherein the extraction solvent used for the liquid-liquid extraction is water.
4. The method according to any one of 1 to 3 above, wherein a content of the low-boiling fraction in the solvent fraction is in a range from 0.1% to 20% by mass.
5. The method according to any one of 1 to 4 above, wherein a content of the silanol compound in the low-boiling fraction is in a range from 200 ppm to 10% by mass.
6. The method according to any one of 1 to 5 above, wherein a weight ratio (Me/Mb) of the extraction solvent (Me) to the low-boiling fraction (Mb) is in a range from 0.5 to 10.
7. The method according to any one of 1 to 6 above, wherein a content of the silanol compound in the at least part of the raffinate that is recycled as the polymerization solvent is 200 ppm or less by mass.
8. The method according to any one of 1 to 7 above, further comprising a step that separates a randomizer between the low-boiling fraction separation step and the silanol removal step, or after the silanol removal step, when the randomizer is used for the polymerization, and at least part of the randomizer is included in the low-boiling fraction.

The method for producing a modified polymer or a hydrogenated product thereof according to the embodiment of the invention is designed so that a modified polymer or a hydrogenated product is produced, the solvent fraction obtained by separating the modified polymer or the like from the reaction solution is distilled to separate the low-boiling fraction containing the hydrocarbon-based solvent and the silanol compound, the silanol compound is removed from the low-boiling fraction by liquid-liquid extraction, and the raffinate is recycled as the polymerization solvent. Since only the low-boiling fraction is subjected to liquid-liquid extraction to remove the silanol compound, the silanol compound can be efficiently and sufficiently removed. Since only a small amount of solvent is treated, the construction cost of liquid-liquid extraction equipment can be reduced while reducing the miming cost of the extraction solvent. The silanol compound can also be removed by disposing of and incinerating the low-boiling fraction. However, the method for producing a modified polymer or a hydrogenated product thereof according to one embodiment of the invention can recycle the hydrocarbon-based solvent included in the low-boiling fraction with reduced running cost.

In the case where the silanol compound is at least one compound among trimethylsilanol, ethyldimethylsilanol, diethylmethylsilanol, dimethylpropylsilanol, dimethylisopropylsilanol, ethylmethylpropylsilanol, ethylmethylisopropylsilanol, triethylsilanol, n-butyldimethylsilanol, sec-buthyldimethylsilanol, and tert-butyldimethylsilanol, the silanol compound can be separated and removed from the solvent fraction separated from the polymer or the like by distillation together with the hydrocarbon-based solvent as the low-boiling fraction.

In the case where the extraction solvent used for liquid-liquid extraction is water, the apparatus and the operation can be simplified as compared with a case of using an organic solvent. It is also advantageous from the environmental point of view.

In the case where a content of the low-boiling fraction in the solvent fraction is in a range from 0.1% to 20% by mass, the silanol compound can be sufficiently distilled, and the construction cost of liquid-liquid extraction equipment can be reduced while reducing the miming cost.

In the case where a content of the silanol compound in the low-boiling fraction is in a range from 200 ppm to 10% by mass, the hydrocarbon-based solvent and the silanol compound included in the low-boiling fraction can be easily and sufficiently separated by liquid-liquid extraction.

In the case where a weight ratio (Me/Mb) of the extraction solvent (Me) to the low-boiling fraction (Mb) is in a range from 0.5 to 10, almost the entire silanol compound included in the low-boiling fraction can be separated and removed from the hydrocarbon-based solvent while reducing the amount of extract including the silanol compound.

In the case where a content of the silanol compound in at least part of the raffinate that is recycled as the polymerization solvent is 200 ppm or less by mass, the raffinate can be advantageously recycled as the polymerization solvent.

In the case where the method further includes a step that separates a randomizer between the low-boiling fraction separation step and the silanol removal step, or after the silanol removal step, when the randomizer is used for the polymerization, and at least part of the randomizer is included in the low-boiling fraction, a fraction containing the randomizer at a high concentration can be recovered, and the randomizer can be recycled by optionally combining an appropriate purification step.

The embodiments will now be described in detail. A method for producing a modified polymer or a hydrogenated product thereof of the embodiment of the present invention includes polymerizing at least one of a conjugated diene and an aromatic vinyl compound as a monomer in a hydrocarbon-based solvent used as a polymerization solvent using an active organometal as a polymerization initiator to obtain a modified polymer or a hydrogenated product thereof, the modified polymer including a functional group in at least one of a main chain and a side chain, the functional group being introduced into the modified polymer using a compound having a functional group protected with a silyl group as a polymerization initiator, a functional group-introducing monomer, or a polymerization terminator, the method further sequentially including the following steps (a) to (c).

(a) A solvent removal step that separates a reaction solution in which the modified polymer or the hydrogenated product is dissolved in the polymerization solvent into a solvent fraction including the hydrocarbon-based solvent, and a solid fraction including the modified polymer or the hydrogenated product.

(b) A low-boiling fraction separation step that distils the solvent fraction to separate a low-boiling fraction including the hydrocarbon-based solvent and a silanol compound.

(c) A silanol removal step that removes at least part of the silanol compound from the low-boiling fraction by liquid-liquid extraction using the low-boiling fraction and an extraction solvent.

At least part of the raffinate from which the silanol compound has been removed by liquid-liquid extraction is recycled as a polymerization solvent.

The hydrogenated product may be obtained by hydrogenating the modified polymer using a known method. It is thus possible to obtain a modified polymer that shows excellent weatherability and the like.

1. Polymerization Solvent

The hydrocarbon-based solvent used as the polymerization solvent is not particularly limited. It is preferable to use a hydrocarbon-based solvent having 4 to 8 carbon atoms. Examples of the hydrocarbon-based solvent include n-butane, isobutane, n-pentane, isopentane, n-hexane, cyclohexane, 1-pentene, 2-pentene, 1-hexene, 2-hexene, n-heptane, n-octane, benzene, toluene, xylene, ethylbenzene, and the like. Among these, n-butane, cyclohexane, n-hexane, n-heptane, and the like are normally used. These hydrocarbon-based solvents may be used singly or in combination of two or more types thereof.

2. Polymerization Initiator

The active organometal is used as a polymerization initiator required for polymerization. An alkali metal compound or an alkaline-earth metal compound is normally used as the active organometal. In this case, a polymer can be produced by anionic polymerization. The polymerization may be by batch polymerization or continuous polymerization. Examples of the alkali metal included in the active site of the molecule of the resulting polymer include lithium, sodium, and potassium. Examples of the alkaline-earth metal included in the active site of the molecule of the resulting polymer include magnesium, barium, and the like. It is particularly preferable to use a lithium compound as the active organometal.

The compound used as the polymerization initiator containing an alkali metal or an alkaline-earth metal is not particularly limited. It is preferable to use an alkyllithium having a hydrocarbon group, a lithium compound having an amide group or an imide group (e.g., lithium alkyleneimide), a derivative thereof, or the like. Examples of other compounds used as the polymerization initiator containing an alkali metal or an alkaline-earth metal include sodium naphthalene, potassium naphthalene, n-butylmagnesium, n-hexylmagnesium, ethoxycalcium, calcium stearate, tert-butoxystrontium, ethoxybarium, isopropoxybarium, ethylmercaptobarium, tert-butoxybarium, phenoxybarium, diethylaminobarium, barium stearate, a barium ketyl, sodium biphenyl, a potassium-tetrahydrofuran complex, a potassium-diethoxyethane complex, a sodium salt of an α-methylstyrene tetramer, and the like.

When a lithium compound having a hydrocarbon group is used as the polymerization initiator, a polymer having a hydrocarbon group at the polymerization initiation end, and a polymerization active site at the other end can be obtained.

The lithium compound having a hydrocarbon group preferably is a compound including a hydrocarbon group having 1 to 20 carbon atoms. Examples of the lithium compound include methyllithium, ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, tert-butyllithium, n-hexyllithium, benzyllithium, stilbenelithium, 1,4-dilithiobutane, a reaction product of n-butyllithium, 1,3-butadiene, and divinylbenzene, and the like. Among these, n-butyllithium and sec-butyllithium are particularly preferable.

When producing a polymer by anionic polymerization using a lithium compound or the like as the polymerization initiator, a conjugated diene and/or an aromatic vinyl compound may be subjected to anionic polymerization in an organic solvent that is inert to the reaction (e.g., hydrocarbon-based solvent such as an aliphatic, alicyclic, and aromatic hydrocarbon compound) using a lithium compound or the like as the polymerization initiator optionally in the presence of a randomizer (described later).

3. Monomer

Examples of the conjugated diene include 1,3-butadiene, isoprene, 2,3-dimethyl-1,3-butadiene, 1,3-pentadiene, 1,3-hexadiene, 1,3-heptadiene, 2,3-dimethylbutadiene, 2-phenyl-1,3-butadiene, 3-methyl-1,3-pentadiene, 2-chloro-1,3-butadiene, and the like. These conjugated dienes may be used singly or in combination of two or more types thereof. Among these, 1,3-butadiene, isoprene, 2,3-dimethyl-1,3-butadiene, and the like are normally used. In particular, 1,3-butadiene is widely used.

Examples of the aromatic vinyl compound include styrene, 2-methylstyrene, 3-methylstyrene, 4-methylstyrene, α-methylstyrene, 2,4-dimethylstyrene, 2,4-diisopropylstyrene, 4-tert-butylstyrene, 5-tert-butyl-2-methylstyrene, vinylethylbenzene, divinylbenzene, trivinylbenzene, divinylnaphthalene, tert-butoxystyrene, vinylbenzyldimethylamine, (4-vinylbenzyl) dimethylaminoethyl ether, N,N-dimethylaminomethylstyrene, N,N-dimethylaminoethylstyrene, 2-ethylstyrene, 3-ethylstyrene, 4-ethylstyrene, 2-tert-butylstyrene, 3-tert-butylstyrene, 4-tert-butylstyrene, vinylxylene, vinylnaphthalene, vinyltoluene, vinylpyridine, diphenylethylene, tertiary amino group-containing diphenylethylene, and the like. These aromatic vinyl compounds may be used singly or in combination of two or more types thereof. Among these, styrene is normally used.

When copolymerizing the conjugated diene and the aromatic vinyl compound, it is preferable to use 1,3-butadiene as the conjugated diene, and use styrene as the aromatic vinyl compound. These monomers show excellent living properties during anionic polymerization, and are easily available. When implementing solution polymerization, the monomer concentration in the solvent is in a range from 5% to 50% by mass, and preferably from 10% to 30% by mass, based on 100% by mass of the total amount of the solvent and the monomer(s), from the viewpoint of productivity and ease of polymerization control.

4. Polymerization Reaction

The modified polymer may be obtained using a polymerization initiator having a functional group protected with a silyl group or a functional group-introducing monomer having a functional group protected with a silyl group, or the modified polymer may be obtained by polymerizing a conjugated diene and/or an aromatic vinyl compound, and then applying a polymerization terminator having a functional group protected with a silyl group. In either case, a polymerization temperature is preferably in a range from –20° C. to 150° C., and particularly preferably from 0° C. to 120° C. The polymerization reaction may be effected under the developed pressure. It is preferable to effect the polymerization reaction under a pressure sufficient to substantially maintain the conjugated diene and/or the aromatic vinyl compound in a liquid phase. The pressure during polymerization may be determined depending on a type of monomer subjected to polymerization, a type of solvent, polymerization temperature, and the like, and may optionally be set to be higher than the developed pressure. The pressure may be increased by pressurizing the reactor using a gas that is inert to the polymerization reaction, for example.

It is preferable to use each raw material (e.g., a polymerization initiator, solvent, and monomer) used for polymerization after removing a reaction inhibitor substance such as water, oxygen, carbon dioxide, and protonic compound. When the polymer is a hydrogenated product included in a thermoplastic elastomer, the glass transition temperature (Tg) of the polymer or the copolymer measured by differential thermal analysis is preferably in a range from –90° C. to 0° C. It is difficult to produce a polymer having a glass transition temperature of less than –90° C. If the glass transition temperature exceeds 0° C., the viscosity may increase to a large extent at room temperature, and handling may be difficult.

5. Modification Reaction

The functional group protected with a silyl group may be introduced into a main chain, side chain, or molecular end of a polymer or copolymer (modification reaction) by (1) effecting a polymerization reaction using an organometallic compound having a functional group protected with a silyl group (or a derivative thereof) as a polymerization initiator to obtain a modified polymer, (2) copolymerizing a conjugated diene, an aromatic vinyl compound, and a monomer that is copolymerizable with the conjugated diene and/or the aromatic vinyl compound and includes a functional group protected with a silyl group to obtain a modified polymer, or (3) polymerizing a conjugated diene and/or an aromatic vinyl compound to obtain a polymer, and terminating polymerization using a compound having a functional group protected with a silyl group as a polymerization terminator to obtain a modified polymer, for example.

Specific examples of the organometallic compound having a functional group protected with a silyl group (see (1)) include 3-[N,N-bis(trimethylsilyl)amino]-1-propyllithium, 5-[N,N-bis(trimethylsilyl)amino]-1-pentyllithium, and the like.

Specific examples of the functional group-introducing monomer that is copolymerizable with the conjugated diene and/or the aromatic vinyl compound and includes a functional group protected with a silyl group (see (2)) include 1-[4-N,N-bis(trimethylsilyl)aminophenyl]-1-phenylethylene, and the like.

Specific examples of the compound that has a functional group protected with a silyl group and is used as the polymerization terminator (see (3)) include N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, N,N',N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, 1-[3-(triethoxysilyl)-propyl]-4-trimethylsilylpiperazine, 1-[3-(trimethoxysilyl)-propyl]-4-trimethylsilylpiperazine, bis[3-(triethoxysilyl)propyl]trimethylsilylamine, bis[3-(trimethoxysilyl)propyl]trimethylsilylamine, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, and the like.

6. Randomizer

A randomizer is optionally used when producing the polymer. The randomizer is a compound that controls the microstructure of a polymer (e.g., increases the number of a vinyl bond (1,2-bonds) of a butadiene moiety of a butadiene-styrene copolymer, or increases the number of a vinyl bond (1,2-bond or 3,4-bond) of an isoprene polymer), or controls the compositional distribution of monomer units in the polymer (e.g., randomizes butadiene unit and styrene unit of a butadiene-styrene copolymer).

The randomizer is not particularly limited. Examples of the randomizer include ethers and tertiary amines such as dimethoxybenzene, tetrahydrofuran, dimethoxyethane, diethylene glycol dibutyl ether, diethylene glycol diethyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1,2-dipiperidinoethane, ethylene glycol dibutyl ether, ethylene glycol diethyl ether, ethylene glycol dimethyl ether, dioxane, trimethylamine, quinuclidine, potassium tert-amylate, potassium tert-butyrate, triphenylphosphine, tetrahydropyran, dibutyl ether, diphenyl ether, anisole, tripropylamine, tributylamine, N,N-diethylaniline, and quinoline, and the like. The randomizer may be used singly or in combination of two or more types thereof.

7. Recycling of Polymerization Solvent

When a conjugated diene and/or an aromatic vinyl compound is polymerized using the above-mentioned hydrocarbon-based solvent and polymerization initiator, a polymer is obtained. When a functional group is introduced into the polymer in the above-mentioned modification reaction, a modified polymer is obtained. Further, a hydrogenated product is obtained by hydrogenating the modified polymer using a known method. The silanol compound is removed from the solvent fraction separated from the solid fraction (i.e., modified polymer or hydrogenated product) by performing the solvent removal step (a), the low-boiling fraction separation step (b), and the silanol removal step (c), and at least part of the raffinate is recycled as the polymerization solvent.

The solvent removal step (a) separates the reaction solution in which the modified polymer or the hydrogenated product is dissolved into a solvent fraction containing the hydrocarbon-based solvent and a solid fraction containing the modified polymer or the hydrogenated product after the polymerization reaction and the modification reaction, or after the hydrogenation reaction. The solvent removal method is not particularly limited. For example, the reaction solution containing the modified polymer or the like is added to and dispersed in hot water contain in a solvent removal tank to produce an emulsion, and the solvent is separated and removed from the modified polymer or the like using water vapor introduced through the bottom of the solvent removal tank (i.e., steam stripping method).

The low-boiling fraction separation step (b) distills the solvent fraction to separate the low-boiling fraction containing the hydrocarbon-based solvent and the silanol compound. The low-boiling fraction is a fraction that is produced when distilling the solvent fraction separated from the solid fraction by the solvent removal step. The low-boiling fraction includes part of the hydrocarbon-based solvent used as the polymerization solvent, and the silanol compound produced from the compound having a silyl group and is used as the modifier. The solvent fraction may be distilled using a normal method that utilizes a distillation column. The low-boiling fraction is a fraction that leaves the top of the distillation column. The silanol compound that leaves the top of the distillation column as the low-boiling fraction together with the polymerization solvent during distillation varies depending on the type of compound having a silyl group (modifier) and the type of hydrocarbon-based solvent. Examples of the silanol compound include trimethylsilanol, ethyldimethylsilanol, diethylmethylsilanol, dimethylpropylsilanol, dimethylisopropylsilanol, ethylmethylpropylsilanol, ethylmethylisopropylsilanol, triethylsilanol, n-butyldimethylsilanol, sec-butyldimethylsilanol, tert-butyldimethylsilanol, and the like.

The combination of the polymerization solvent and the compound having a silyl group (modifier) is not particularly limited. It is preferable to select the polymerization solvent and the compound having a silyl group so that a larger amount of silanol compound produced from the compound having a silyl group leaves the top of the distillation column as the low-boiling fraction together with the polymerization solvent during distillation. For example, when using cyclohexane or n-hexane (particularly cyclohexane) as the polymerization solvent, it is preferable to use a compound that has a silyl group and produces trimethylsilanol or ethyldimethylsilanol (particularly trimethylsilanol) as the silanol compound.

The ratio of the low-boiling fraction produced by the distilling solvent fraction to the total amount of the solvent fraction is not particularly limited, and varies depending on the types and the amounts of solvent, monomer, additive, and the like used for polymerization, the polymerization conditions, the distillation conditions, and the like. It is preferable that the amount of low-boiling fraction fed to the subsequent silanol removal step be small. The content of the low-boiling fraction in the solvent fraction is normally in a range from 0.1% to 20% by mass, preferably from 0.1% to 10% by mass, and particularly from 0.1% to 5% by mass. The ratio of the silanol compound included in the low-boiling fraction to the total amount of the low-boiling fraction is not particularly limited, and varies depending on the amount of compound having a silyl group, the polymerization conditions, the distillation conditions, and the like. The content of the silanol compound in the low-boiling fraction is normally in a range from 200 ppm to 10% by mass, preferably from 1,000 ppm to 10% by mass, and particularly from 3,000 ppm to 10% by mass.

The silanol removal step (c) removes (extracts) at least part of the silanol compound from the low-boiling fraction by liquid-liquid extraction using the low-boiling fraction and the extraction solvent. Most of the silanol compound is extracted into the extraction solvent by liquid-liquid extraction, while the hydrocarbon-based solvent remains in the low-boiling fraction. Examples of the extraction solvent used for liquid-liquid extraction include water, acetone, methylethylketone, methanol, ethanol, and the like. It is preferable to use water as the extraction solvent when the silanol compound is trimethylsilanol or ethyldimethylsilanol (particularly trimethylsilanol). Since only the low-boiling fraction (i.e., part of the solvent fraction) is subjected to liquid-liquid extraction in the silanol removal step, simple liquid-liquid extraction equipment can be used, and the construction cost can be reduced. Since only a small amount of extraction solvent is used, the liquid-liquid extraction cost can also be reduced.

The ratio of the extraction solvent used for liquid-liquid extraction to the total amount of the low-boiling fraction is not particularly limited as long as the silanol compound can be efficiently extracted and removed. The extraction solvent may be used in an appropriate amount depending on the type of extraction solvent, the type of silanol compound, and the like. It is preferable to use the extraction solvent in such an amount that the weight ratio (Me/Mb) of the extraction solvent (Me) to the low-boiling fraction (Mb) is in a range from 0.5 to 10, preferably from 0.5 to 5, and particularly from 0.5 to 2. The weight ratio (Me/Mb) is preferably in a range from 1 to 2 when the silanol compound is trimethylsilanol, and the extraction solvent is water.

At least part of the raffinate from which the silanol compound has been removed by liquid-liquid extraction in the silanol removal step can be recycled as a polymerization solvent. When at least part of the raffinate is recycled as the polymerization solvent, it is preferable that the solvent does not include the silanol compound, or a content of the silanol compound in the solvent is preferably 200 ppm or less by mass, and particularly 100 ppm or less by mass. In this case, the silanol compound can be made harmless by increasing the amount of the polymerization initiator, for example. Therefore, polymerization can be effected successfully. The raffinate may be appropriately recycled to obtain a polymerization solvent having a silanol compound content within the above range. For example, the raffinate may be mixed with the solvent fraction that includes only a small amount of silanol compound and remains after separating the low-boiling fraction in the low-boiling fraction separation step, or the raffinate may be fed back to the distillation column used for distillation for separating the low-boiling fraction from the solvent fraction after polymerization, and the solvent fraction having a silanol compound content within the above range may be obtained from the bottom of the distillation column. In either case, when the solvent fraction obtained by recycling the raffinate includes a heavy component such as an oligomer of the conjugated diene or the aromatic vinyl compound, or an anti-aging agent, it is necessary to perform a heavy component removal step. An amount of the silanol compound included in the solvent (e.g., raffinate) may be quantitatively determined by an internal reference method using gas chromatography.

When water is used as the extraction solvent, water remains in the raffinate in an amount of 500 ppm or less by mass (particularly 200 to 300 ppm by mass). Since water inhibits polymerization, it is preferable to remove water before recycling the raffinate as the polymerization solvent. Water may be removed using an arbitrary method, and may be removed using special equipment. It is preferable to feed the raffinate back to the distillation column used for distillation for separating the low-boiling fraction from the solvent fraction after polymerization. In this case, special equipment is unnecessary, and it is advantageous from the viewpoint of the process and cost.

When the randomizer is used for polymerization, a step that separates the randomizer (randomizer separation step) may be provided between the low-boiling fraction separation step and the silanol removal step, or after the silanol removal step. When the randomizer is used for polymerization, and has a volatility equal to or higher than that of the silanol compound produced, the low-boiling fraction obtained by distillation includes the randomizer at a high concentration. If the low-boiling fraction is extracted directly with the extraction solvent, the distribution ratio of the silanol compound may be decreased due to the randomizer, and a large amount of extraction solvent may be required. Moreover, the randomizer may be mixed into the extract together with the silanol compound. The randomizer can be recycled for polymerization by separating and recovering the randomizer in the randomizer separation step, and optionally combining an appropriate purification step. The randomizer separation step is not indispensable when the randomizer is not used for polymerization, or has a volatility lower than that of the silanol compound produced.

Figure 1:
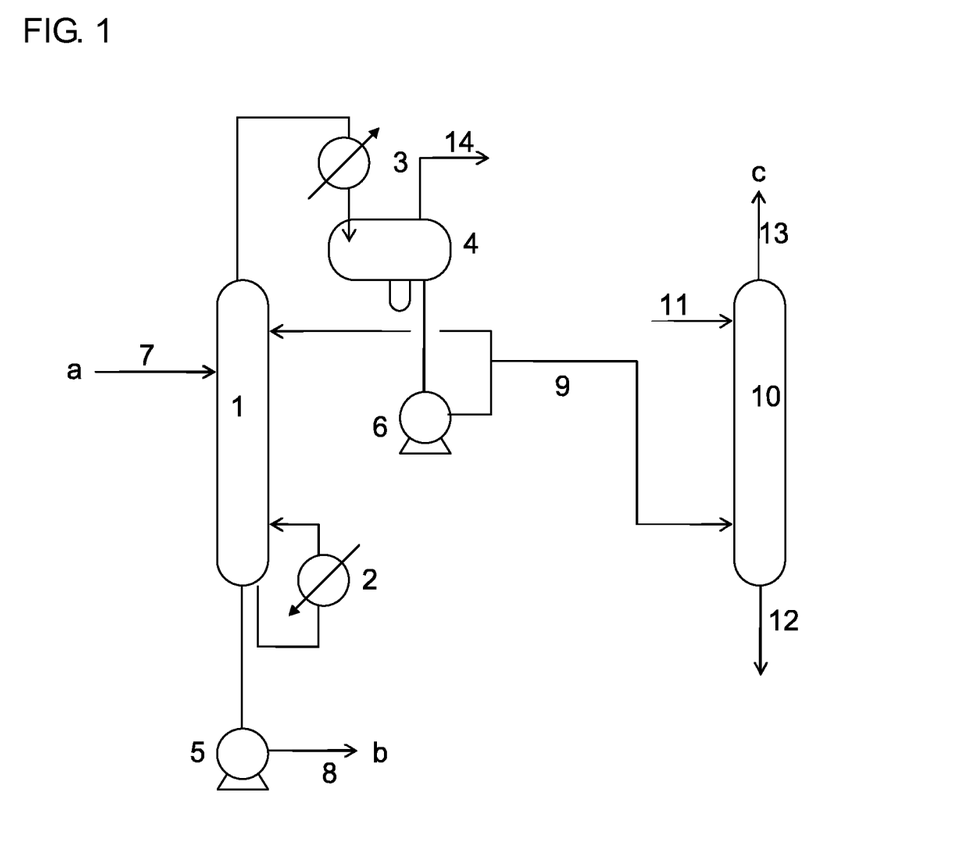
FIG. 1 is a schematic view illustrating a process implemented using an example of a solvent purification apparatus according to the present invention.

Each step for recycling the polymerization solvent may be performed using an apparatus illustrated in FIG. 1, for example.

Specifically, a reaction solution is separated into a solvent fraction containing a hydrocarbon-based solvent, and a solid fraction containing a modified polymer or a hydrogenated product using a steam stripping method or the like. A solvent fraction a is fed to a distillation column 1 through a raw material solvent feed pipe 7, and a low-boiling fraction containing the hydrocarbon-based solvent and a silanol compound is extracted from the top of the distillation column 1. The hydrocarbon-based solvent from which most of the silanol compound has been removed is extracted through a drawing pipe 8 at the bottom of the distillation column 1 as a bottom product b. The low-boiling fraction is fed to an extraction column 10 through a distillation pipe 9. An extraction solvent is fed to the extraction column 10 through an extraction solvent feed pipe 11, and the low-boiling fraction is separated into the hydrocarbon-based solvent and the silanol compound by liquid-liquid extraction. The extraction solvent containing the silanol compound is extracted through an extraction solvent phase drawing pipe 12 at the bottom of the extraction column 10, and the hydrocarbon-based solvent containing a small amount of extraction solvent and silanol compound is extracted through a solvent phase drawing pipe 13 at the top of the extraction column 10. A bottom product b containing only a small amount of silanol compound, and an overhead extract c having a low silanol compound concentration can thus be obtained. In FIG. 1, numeral reference 2 denotes a heater; numeral reference 3 denotes a condenser; numeral reference 4 denotes a reflux drum; numeral references 5 and 6 denote pumps; and numeral reference 14 denotes a gas drawing pipe.

When a volatile randomizer is used, it is necessary to perform a distillation step for removing the randomizer. In this case, each step for recycling the polymerization solvent may be performed using the apparatus illustrated in FIG. 2, for example.

Figure 2:
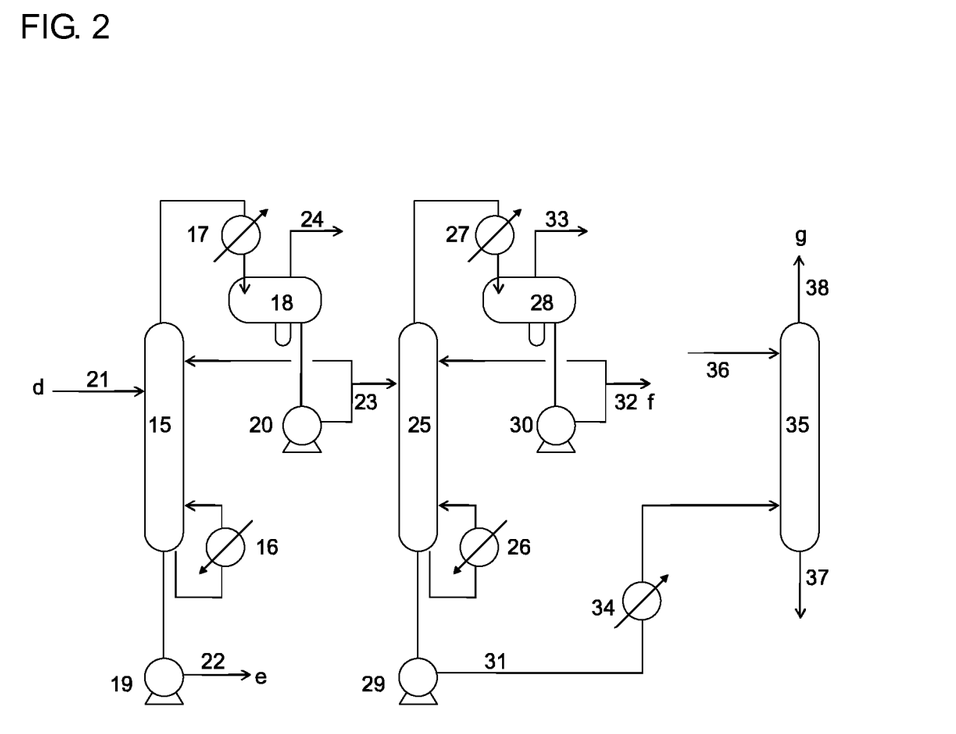
FIG. 2 is a schematic view illustrating a process implemented using another example of a solvent purification apparatus according to the present invention.

Specifically, a reaction solution separated into a solvent fraction containing a hydrocarbon-based solvent and a solid fraction containing a modified polymer or a hydrogenated product using a steam stripping method or the like. A solvent fraction d is fed to a distillation column 15 through a raw material solvent feed pipe 21, and a low-boiling fraction containing the hydrocarbon-based solvent and a silanol compound is extracted from the top of the distillation column 15. The hydrocarbon-based solvent from which most of the silanol compound has been removed is extracted through a drawing pipe 22 at the bottom of the distillation column 1 as a bottom product e. The low-boiling fraction is fed to a distillation column 25 through a distillation pipe 23. The randomizer included in the low-boiling fraction is separated, extracted from the top of the distillation column 25 as a distillate containing a large amount of randomizer, and extracted as a distillate f through a drawing pipe 32. The low-boiling fraction from which most of the randomizer has been removed is fed from the bottom of the distillation column 25 to an extraction column 35 through a distillation pipe 31. An extraction solvent is fed to the extraction column 35 through an extraction solvent feed pipe 36, and the low-boiling fraction is separated into the hydrocarbon-based solvent and the silanol compound by liquid-liquid extraction. The extraction solvent containing the silanol compound is extracted through an extraction solvent phase drawing pipe 37 at the bottom of the extraction column 35, and the hydrocarbon-based solvent (raffinate) containing a small amount of extraction solvent and silanol compound is extracted as an overhead extract g through a solvent phase drawing pipe 38 at the top of the extraction column 35. A bottom product e containing only a small amount of silanol compound, and a distillate f and an overhead extract g both having a low silanol compound concentration can thus be obtained. In FIG. 2, numeral reference 15 denotes a distillation column; numeral reference 16 denotes a heater; numeral reference 17 denotes a condenser; numeral reference 18 denotes a reflux drum; numeral references 19 and 20 denote pumps; numeral reference 24 denotes a gas drawing pipe; numeral reference 26 denotes a heater; numeral reference 27 denotes a condenser; numeral reference 28 denotes a reflux drum; numeral references 29 and 30 denote pumps; numeral reference 33 denotes a gas drawing pipe; and numeral reference 34 denotes a condenser.

Since the distillate f includes the randomizer at a high concentration, the randomizer can be recycled for polymerization by optionally combining an appropriate purification step.

EXAMPLES

Hereinafter, the present invention is specifically explained using examples.

Example 1

Trimethylsilanol was added to cyclohexane at a concentration of 100 ppm to prepare a solvent taking account of a situation in which a small amount of silanol compound is included in a solvent that is recovered and recycled. An autoclave reactor (internal volume: 5 liters) of which the internal atmosphere had been replaced with nitrogen, was charged with 2,750 g of cyclohexane including 100 ppm of trimethylsilanol, 3.25 mmol of 2,2-di(tetrahydrofuryl)propane, 125 g of styrene, and 365 g of 1,3-butadiene. After adjusting the temperature of the mixture contained in the reactor to 10° C., a cyclohexane solution of n-butyllithium (8.80 mmol) was added to the mixture to initiate polymerization. Note that the amount of n-butyllithium includes an amount necessary for converting trimethylsilanol included in the solvent into lithium trimethylsilanolate (harmless compound) in the reactor. The polymerization successfully proceeded under thermally insulated conditions, and the maximum temperature reached 85° C.

10 g of 1,3-butadiene was added to the mixture when the polymerization conversion rate reached 99%, and the mixture was subjected to polymerization for a further 5 minutes. A cyclohexane solution of N,N-bis(trimethylsilyl)aminopropyltriethoxysilane (4.96 mmol) was added and reacted for 15 minutes. Subsequently, 2.0 g of 2,6-di-tert-butyl-p-cresol was added to the resulting polymer solution. A solvent was removed by steam stripping using hot water of which pH had been adjusted to 9 with sodium hydroxide.

Mixed vapor of the solvent and water produced by steam stripping was condensed using a condenser, and the solvent phase was separated by static separation to obtain a mixed solvent (A) having a composition shown in Table 1. A solvent fraction a having the composition shown in Table 1 was prepared based on the composition of the mixed solvent (A). Note that some of the components were omitted when preparing the solvent fraction a. A distillation operation and an extraction operation were performed under the following conditions (raw material solvent: solvent fraction a) using the solvent purification apparatus illustrated in FIG. 1 to obtain a bottom product b and an overhead extract c (see Table 1). The trimethylsilanol concentration in the bottom product b could thus be reduced to a level appropriate for the polymerization solvent. Even when the bottom product b and overhead extract c were mixed, the water concentration and the trimethylsilanol concentration were appropriate for the polymerization solvent. Therefore, the overhead extract c could also be recycled as the polymerization solvent.

Note that it is necessary to perform a heavy component removal step in order to use the bottom product b or a mixture of the bottom product b and overhead extract c as the polymerization solvent when the bottom product b includes a heavy component such as an oligomer of the conjugated diene or the aromatic vinyl compound, or an anti-aging agent.

The distillation operation and the extraction operation using the apparatus illustrated in FIG. 1 may be performed as described below.

A solvent fraction a is fed to a distillation column 1 through a raw material solvent feed pipe 7, and a low-boiling fraction containing cyclohexane and trimethylsilanol is extracted from the top of the distillation column 1. Cyclohexane from which most of the trimethylsilanol has been removed is extracted through a drawing pipe 8 at the bottom of the distillation column 1 as a bottom product b. The low-boiling fraction is fed to an extraction column 10 through a distillation pipe 9. Water is fed to the extraction column 10 through an extraction solvent feed pipe 11, and the low-boiling fraction is separated into cyclohexane and trimethylsilanol by liquid-liquid extraction. Water containing trimethylsilanol is extracted through an extraction solvent phase drawing pipe 12 at the bottom of the extraction column 10, and cyclohexane containing a small amount of water and trimethylsilanol is extracted through a solvent phase drawing pipe 13 at the top of the extraction column 10. The bottom product b containing only a small amount of trimethylsilanol, and the overhead extract c having a low trimethylsilanol concentration can thus be obtained.

Solvent Purification Apparatus and Operation Conditions

[1] The solvent purification apparatus illustrated in FIG. 1 was used for solvent purification.

(1) Type of distillation column 1 and operation conditions
Type: packed column
Bed height: equivalent to 10 theoretical plates
Operating pressure: 0.12 MPa(G)
Reflux ratio: 4
(2) Solvent a fed to distillation column 1
Material: solvent fraction a having the composition shown in Table 1
Feed position: position corresponding to about ⅓rd of the distance from the top of the column to the bed height
Feed rate: 7500 g/h
Feed temperature: 30° C.
(3) Type of extraction column 10 and operation conditions
Type: packed column
Bed height: equivalent to 5 theoretical plates
Operating pressure: 0.10 MPa(G)
(4) Solvent fed to extraction column 10
Material: liquid fed through distillation pipe 9
Feed position: channel at the bottom of the extraction column
Feed rate: 15 g/h
Feed temperature: 40° C.
(5) Extraction solvent fed to extraction column 10
Material: water
Feed position: channel at the top of the extraction column

TABLE 1

|  |  | Solvent (A) | Solvent fraction a | Bottom product b | Overhead extract c | Mixture of b and c |
|---|---|---|---|---|---|---|
| Temperature |  | — | 30° C. | 111° C. | 40° C. | — |
| Flow rate |  | — | 7500 g/h | 7480 g/h | 13.6 g/h | — |
| Component | Cyclohexane | 99.8% | 99.9% | 99.9%< | 84.7% | 99.9%< |
|  | 2,2-Di(tetrahydrofuryl)propane | 218 ppm | — | — | — | — |
|  | Tetrahydrofuran | — | — | — | — | — |
|  | 1,3-Butadiene | 531 ppm | 550 ppm | <10 ppm | 14.1% | 270 ppm |
|  | Styrene | 41 ppm | — | — | — | — |
|  | Trimethylsilanol | 194 ppm | 200 ppm | 15 ppm | 4780 ppm | 23 ppm |
|  | Ethanol | 20 ppm | 20 ppm | <10 ppm | <10 ppm | <10 ppm |
|  | Water | 261 ppm | 260 ppm | <1 ppm | 349 ppm | <1 ppm |
|  | Other heavy component | 460 ppm | — | — | — | — |

Feed rate: 70 g/h
Feed temperature: 40° C.

Example 2

A distillation operation and an extraction operation were performed in the same manner as those in Example 1, except that the overhead extract c extracted through the solvent phase drawing pipe 13 was mixed into the solvent a, and fed to the distillation column 1 through the raw material solvent feed pipe 7. In this case, since trimethylsilanol included in the overhead extract c extracted through the solvent phase drawing pipe 13 is mixed into the solvent fraction a, the concentration of trimethylsilanol fed to the distillation column 1 increases for a while after the start of purification. However, when the mass flow rate of trimethylsilanol included in the solvent fraction a (raw material solvent) has become equal to the mass flow rate of trimethylsilanol in the extraction solvent phase drawing pipe 12, the trimethylsilanol concentration in the solvent fed to the distillation column 1, and the trimethylsilanol concentration in the bottom product b extracted through the drawing pipe 8 become constant. Since the water concentration and the trimethylsilanol concentration in the bottom product b extracted through the drawing pipe 8 are appropriate for the polymerization solvent, only the bottom product b extracted through the drawing pipe 8 may be used as the polymerization solvent. Note that it is necessary to perform a heavy component removal step in order to use the bottom product b as the polymerization solvent when the bottom product b includes a heavy component such as an oligomer of the conjugated diene or the aromatic vinyl compound, or an anti-aging agent.

Example 3

A polymerization reaction and a modification reaction were effected in the same manner as those in Example 1, except that 50.0 g of tetrahydrofuran was used instead of 2,2-di(tetrahydrofuryl)propane used in Example 1.

Next, 2.0 g of 2,6-di-tert-butyl-p-cresol was added to the polymer solution. The solvent was removed by steam stripping using hot water of which the pH had been adjusted to 9 with sodium hydroxide.

Mixed vapor of the solvent and water produced by steam stripping was condensed using a condenser, and the solvent phase was separated by static separation to obtain a mixed solvent (D) having the composition shown in Table 2. A solvent fraction d having the composition shown in Table 2 was prepared based on the composition of the mixed solvent (D). Note that some of the components were omitted when preparing the solvent fraction d. A distillation operation and an extraction operation were performed under the following conditions (raw material solvent: solvent fraction d) using the solvent purification apparatus illustrated in FIG. 2 to obtain a bottom product e, a distillate f, and an overhead extract g (see Table 2). The trimethylsilanol concentration in the bottom product e could thus be reduced to a level appropriate for the polymerization solvent. Even when the bottom product e and overhead extract g were mixed, the water concentration and the trimethylsilanol concentration were appropriate for the polymerization solvent.

Note that it is necessary to perform a heavy component removal step in order to use the bottom product e or a mixture of the bottom product e and overhead extract g as the polymerization solvent when the bottom product e includes a heavy component such as an oligomer of the conjugated diene or the aromatic vinyl compound, or an anti-aging agent. Since the distillate f includes tetrahydrofuran at a high concentration, tetrahydrofuran that has been recovered from the distillate f containing 1,3-butadiene, water, and ethanol can be added to the reactor as the randomizer.

Since tetrahydrofuran easily volatilizes as compared with trimethylsilanol, the low-boiling fraction fed through the distillation pipe 23 includes tetrahydrofuran at a high concentration. If the low-boiling fraction is extracted directly with water, the distribution ratio (W/O) of trimethylsilanol decreases due to tetrahydrofuran. Specifically, when the low-boiling fraction is fed directly to the extraction column 35, it is necessary to increase the size of the extraction column 35, and a large amount of water is required as the extraction solvent. Therefore, the distillation column 25 was provided to extract the distillate f including tetrahydrofuran at a high concentration, and the low-boiling fraction having a reduced tetrahydrofuran content was fed to the extraction column 35. Since tetrahydrofuran was used as the randomizer in Example 3, the distillation column 25 was provided in addition to the distillation column 15.

TABLE 2

|  |  | Solvent (D) | Solvent fraction d | Bottom product e | Distillate f | Overhead extract g | Mixture of bottom product e and overhead extract g |
|---|---|---|---|---|---|---|---|
| Temperature |  | — | 30° C. | 110° C. | 40° C. | 40° C. | — |
| Flow rate |  | — | 7500 g/h | 7393 g/h | 14.4 g/h | 82.7 g/h | — |
| Component | Cyclohexane | 98.1% | 98.1% | 98.3% | 16.6% | 99.9% | 98.4% |
|  | 2,2-Di(tetrahydrofuryl)propane | — | — | — | — | — | — |
|  | Tetrahydrofuran | 1.78% | 1.78% | 1.65% | 69.2% | 836 ppm | 1.64% |
|  | 1,3-Butadiene | 522 ppm | 550 ppm | <10 ppm | 13.1% | <10 ppm | <10 ppm |
|  | Styrene | 40 ppm | — | — | — | — | — |
|  | Trimethylsilanol | 191 ppm | 200 ppm | 34 ppm | 125 ppm | 360 ppm | 37 ppm |
|  | Ethanol | 20 ppm | 20 ppm | <10 ppm | 7070 ppm | <10 ppm | <10 ppm |
|  | Water | 292 ppm | 300 ppm | <1 ppm | 3800 ppm | 267 ppm | 3 ppm |
|  | Other heavy component | 450 ppm | — | — | — | — | — |

The distillation operation and the extraction operation using the apparatus illustrated in FIG. 2 may be performed as described below.

A solvent fraction d is fed to a distillation column 15 through a raw material solvent feed pipe 21, and a low-boiling fraction containing cyclohexane, tetrahydrofuran, and trimethylsilanol is extracted from the top of the distillation column 15. Cyclohexane from which most of the trimethylsilanol has been removed is extracted through a drawing pipe 22 at the bottom of the distillation column 15 as a bottom product e. The low-boiling fraction is fed to a distillation column 25 through a distillation pipe 23. Tetrahydrofuran included in the low-boiling fraction is separated, extracted from the top of the distillation column 25 as a distillate containing a large amount of tetrahydrofuran, and extracted as a distillate f through a drawing pipe 32. The low-boiling fraction from which most of the tetrahydrofuran has been removed is fed from the bottom of the distillation column 25 to an extraction column 35 through a distillation pipe 31. Water is fed to the extraction column 35 through an extraction solvent feed pipe 36, and the low-boiling fraction is separated into cyclohexane and trimethylsilanol by liquid-liquid extraction. Water containing trimethylsilanol is extracted through an extraction solvent phase drawing pipe 37 at the bottom of the extraction column 35, and cyclohexane containing a small amount of water and trimethylsilanol is extracted through a solvent phase drawing pipe 38 at the top of the extraction column 35. The bottom product e containing only a small amount of trimethylsilanol, and the distillate f and overhead extract g having a low trimethylsilanol concentration can thus be obtained.

Solvent Purification Apparatus and Operation Conditions

[1] The solvent purification apparatus illustrated in FIG. 2 was used for solvent purification.

(1) Type of distillation column 15 and operation conditions
Type: packed column
Bed height: equivalent to 10 theoretical plates
Operating pressure: 0.12 MPa(G)
Reflux ratio: 0.41
(2) Solvent d fed to distillation column 15
Material: solvent fraction d having the composition shown in Table 2
Feed position: position corresponding to about ⅓rd of the distance from the top of the column to the bed height
Feed rate: 7,500 g/h
Feed temperature: 30° C.
(3) Type of distillation column 25 and operation conditions
Type: packed column
Bed height: equivalent to 45 theoretical plates
Operating pressure: 0.12 MPa(G)
Reflux ratio: 20
(4) Solvent fed to distillation column 25
Material: liquid fed from distillation column 15
Feed position: position corresponding to about ¼th of the distance from the top of the column to the bed height
Feed rate: 100 g/h
Feed temperature: 40° C.
(5) Type of extraction column 35 and operation conditions
Type: packed column
Bed height: equivalent to 3 theoretical plates
Operating pressure: 0.10 MPa(G)
(6) Solvent fed to extraction column 35
Material: bottoms fed from distillation column 25
Feed position: channel at the bottom of the extraction column
Feed rate: 84 g/h
Feed temperature: 40° C.
(7) Extraction solvent fed to extraction column 35
Material: water
Feed position: channel at the top of the extraction column
Feed rate: 150 g/h
Feed temperature: 40° C.

Example 4

A distillation operation and an extraction operation were performed in the same manner as those in Example 3, except that the distillate f and overhead extract g extracted through the drawing pipe 32 and the solvent phase drawing pipe 38 were mixed into the solvent d, and fed to the distillation column 15 through the raw material solvent feed pipe 21. In this case, since trimethylsilanol included in the overhead extract g extracted through the solvent phase drawing pipe 38 is mixed into the solvent fraction d, the concentration of trimethylsilanol fed to the distillation column 15 increases for a while after the start of purification. However, when the mass flow rate of trimethylsilanol included in the solvent fraction d (raw material solvent) has become equal to the mass flow rate of trimethylsilanol included in the liquid that flows through the extraction solvent phase drawing pipe 37, the trimethylsilanol concentration in the solvent fed to the distillation column 15, and the trimethylsilanol concentration in the bottom product e extracted through the drawing pipe 22 become constant. Since the water concentration and the trimethylsilanol concentration in the bottom product e extracted through the drawing pipe 22 are appropriate for the polymerization solvent, only the bottom product e extracted through the drawing pipe 22 may be used as the polymerization solvent. The tetrahydrofuran concentration in the solvent d is almost equal to the tetrahydrofuran concentration in the bottom product e extracted through the drawing pipe 22. Therefore, it suffices to add only a small amount of tetrahydrofuran when recycling the bottom product e extracted through the drawing pipe 22 as the polymerization solvent. Note that it is necessary to perform a heavy component removal step in order to use the bottom product e as the polymerization solvent when the bottom product e includes a heavy component such as an oligomer of the conjugated diene or the aromatic vinyl compound, or an anti-aging agent.

The invention may be applied to a technical field in which a silanol compound that inhibits polymerization is removed from a solvent fraction separated from a solid fraction containing a polymer or the like, and the residue is recycled as a polymerization solvent when polymerizing at least one of a conjugated diene and an aromatic vinyl compound using a modifier in a hydrocarbon-based solvent as the polymerization solvent.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for producing a modified polymer or a hydrogenated product thereof, the method comprising:
polymerizing a monomer comprising at least one of a conjugated diene or an aromatic vinyl compound in a polymerization solvent which includes a hydrocarbon-based solvent, using a polymerization initiator which includes an active organometal to obtain a reaction solution in which the modified polymer or the hydrogenated product thereof is dissolved in the polymerization solvent;
introducing a functional group into at least one of a main chain or a side chain of the modified polymer or the hydrogenated product thereof, using a compound having the functional group protected with a silyl group as a polymerization initiator, as a functional group-introducing monomer, or as a polymerization terminator;
separating the reaction solution into a solvent fraction including the hydrocarbon-based solvent, and a solid fraction including the modified polymer or the hydrogenated product thereof;

distilling the solvent fraction separated from the reaction solution to obtain a low-boiling fraction including the hydrocarbon-based solvent and a silanol compound, a content of the silanol compound in the low-boiling fraction being in a range from 200 ppm to 10% by mass;

removing at least part of the silanol compound from the low-boiling fraction by liquid-liquid extraction using the low-boiling fraction and an extraction solvent; and recycling at least part of a raffinate of the low-boiling fraction from which the at least part of the silanol compound has been removed by the liquid-liquid extraction, as a polymerization solvent.

2. The method according to claim 1, wherein the silanol compound is at least one of trimethylsilanol, ethyldimethylsilanol, diethylmethylsilanol, dimethylpropylsilanol, dimethylisopropylsilanol, ethylmethylpropylsilanol, ethylmethylisopropylsilanol, triethylsilanol, n-butyldimethylsilanol, sec-buthyldimethylsilanol, or tert-butyldimethylsilanol.

3. The method according to claim 1, wherein the extraction solvent used for the liquid-liquid extraction is water.

4. The method according to claim 1, wherein a content of the low-boiling fraction in the solvent fraction is in a range from 0.1% to 20% by mass before distilling the solvent fraction.

5. The method according to claim 1, wherein a weight ratio (Me/Mb) of the extraction solvent (Me) to the low-boiling fraction (Mb) is in a range from 0.5 to 10 when removing the at least part of the silanol compound from the low-boiling fraction.

6. The method according to claim 1, wherein a content of the silanol compound in the at least part of the raffinate that is recycled as the polymerization solvent is 200 ppm or less by mass.

7. The method according to claim 1,
wherein a randomizer is used for polymerizing the monomer, and at least part of the randomizer is included in the low-boiling fraction, and
wherein the method further comprises:
separating the randomizer from the low-boiling fraction after distilling the solvent fraction and before removing the silanol compound, or after removing the silanol compound.

8. The method according to claim 2, wherein the extraction solvent used for the liquid-liquid extraction is water.

9. The method according to claim 2, wherein a content of the low-boiling fraction in the solvent fraction is in a range from 0.1% to 20% by mass before distilling the solvent fraction.

10. The method according to claim 2, wherein a weight ratio (Me/Mb) of the extraction solvent (Me) to the low-boiling fraction (Mb) is in a range from 0.5 to 10 when removing the at least part of the silanol compound from the low-boiling fraction.

11. The method according to claim 2, wherein a content of the silanol compound in the at least part of the raffinate that is recycled as the polymerization solvent is 200 ppm or less by mass.

12. The method according to claim 2,
wherein a randomizer is used for polymerizing the monomer, and at least part of the randomizer is included in the low-boiling fraction, and
wherein the method further comprises:
separating the randomizer from the low-boiling fraction after distilling the solvent fraction and before removing the silanol compound, or after removing the silanol compound.

13. The method according to claim 8, wherein a content of the low-boiling fraction in the solvent fraction is in a range from 0.1% to 20% by mass before distilling the solvent fraction.

14. The method according to claim 8, wherein a weight ratio (Me/Mb) of the extraction solvent (Me) to the low-boiling fraction (Mb) is in a range from 0.5 to 10 when removing the at least part of the silanol compound from the low-boiling fraction.

15. The method according to claim 8, wherein a content of the silanol compound in the at least part of the raffinate that is recycled as the polymerization solvent is 200 ppm or less by mass.

16. The method according to claim 8,
wherein a randomizer is used for polymerizing the monomer, and at least part of the randomizer is included in the low-boiling fraction, and
wherein the method further comprises:
separating the randomizer from the low-boiling fraction after distilling the solvent fraction and before removing the silanol compound, or after removing the silanol compound.

17. The method according to claim 13, wherein a weight ratio (Me/Mb) of the extraction solvent (Me) to the low-boiling fraction (Mb) is in a range from 0.5 to 10 when removing the at least part of the silanol compound from the low-boiling fraction.

18. The method according to claim 17, wherein a content of the silanol compound in the at least part of the raffinate that is recycled as the polymerization solvent is 200 ppm or less by mass.

19. The method according to claim 17,
wherein a randomizer is used for polymerizing the monomer, and at least part of the randomizer is included in the low-boiling fraction, and
wherein the method further comprises:
separating the randomizer from the low-boiling fraction after distilling the solvent fraction and before removing the silanol compound, or after removing the silanol compound.

* * * * *